(12) United States Patent
Hamann et al.

(10) Patent No.: US 7,198,713 B2
(45) Date of Patent: Apr. 3, 2007

(54) INSTALLATION FOR THE REMOVAL AND THE DEACTIVATION OF ORGANISMS IN THE BALLAST WATER

(75) Inventors: Knud Hamann, Appel (DE); Holger Hamann, Seevetal (DE)

(73) Assignee: Hammann AG, Hollenstedt (DE)

( * ) Notice: Subject to any disclaimer, the term of this patent is extended or adjusted under 35 U.S.C. 154(b) by 244 days.

(21) Appl. No.: 10/771,032

(22) Filed: Feb. 3, 2004

(65) Prior Publication Data

US 2004/0159599 A1 Aug. 19, 2004

(30) Foreign Application Priority Data

Feb. 15, 2003 (DE) .......................... 203 02 516 U

(51) Int. Cl.
*C02F 9/08* (2006.01)
*C02F 103/00* (2006.01)
*B01D 36/00* (2006.01)

(52) U.S. Cl. ..................... 210/108; 210/137; 210/202; 210/253; 210/512.2; 210/764

(58) Field of Classification Search ............... 210/202, 210/205, 253, 258, 259, 512.2, 512.3, 764, 210/108, 137, 411
See application file for complete search history.

(56) References Cited

U.S. PATENT DOCUMENTS

| | | | | |
|---|---|---|---|---|
| 1,181,762 A | * | 5/1916 | Hathaway | 210/451 |
| 2,228,017 A | * | 1/1941 | Pecker | 210/622 |
| 3,577,341 A | * | 5/1971 | Keith, Jr. et al. | 210/712 |
| 3,677,405 A | * | 7/1972 | Keith, Jr. | 210/774 |
| 4,680,109 A | * | 7/1987 | Yamada et al. | 210/103 |
| 4,716,210 A | * | 12/1987 | Trummelmeyer et al. | 528/75 |
| 5,158,677 A | * | 10/1992 | Hewitt et al. | 210/202 |
| 5,484,536 A | * | 1/1996 | Yamaguchi et al. | 210/741 |
| 5,628,898 A | | 5/1997 | Eimer | 210/108 |
| 5,807,486 A | | 9/1998 | Busch, Jr. | |
| 5,932,112 A | * | 8/1999 | Browning, Jr. | 210/750 |
| 6,171,508 B1 | * | 1/2001 | Browning, Jr. | 210/750 |
| 6,346,197 B1 | * | 2/2002 | Stephenson et al. | 210/704 |
| 6,458,268 B1 | * | 10/2002 | Grandprey et al. | 210/96.1 |
| 6,565,744 B2 | * | 5/2003 | Levitin et al. | 210/181 |
| 2003/0015481 A1 | | 1/2003 | Eidem | 210/760 |

FOREIGN PATENT DOCUMENTS

| | | |
|---|---|---|
| DE | 43 12 731 C2 | 11/1994 |
| DE | 199 37 989 A1 | 2/2001 |
| DE | 101 19 119 A1 | 10/2002 |
| GB | 2 312 892 A | 11/1997 |
| WO | 01/38232 A1 | 5/2001 |
| WO | 0244089 | 6/2002 |

* cited by examiner

OTHER PUBLICATIONS

Gundelach, W., u.a.: Der Hydrozyklon, Ein einfaches und billiges Gerät für das Klassieren und Eindicken; Chemie-Ing-Techn.,32, 1960, Nr.4,S.279-284 (with English Abstract).

*Primary Examiner*—Duane Smith
*Assistant Examiner*—Douglas J. Theisen
(74) *Attorney, Agent, or Firm*—Vidas, Arrett & Steinkraus, P.A.

(57) ABSTRACT

Installation for the removal and the deactivation of organisms in the ballast water, with the following characteristic features:
  a first feed pump for conveying the ballast water,
  an equipment for gravity precipitation of coarser solids and bigger organisms, connected to the first feed pump, and/or a backwashable filtration equipment,
  a downstream side connected equipment for the deactivation of micro-germs.

47 Claims, 3 Drawing Sheets

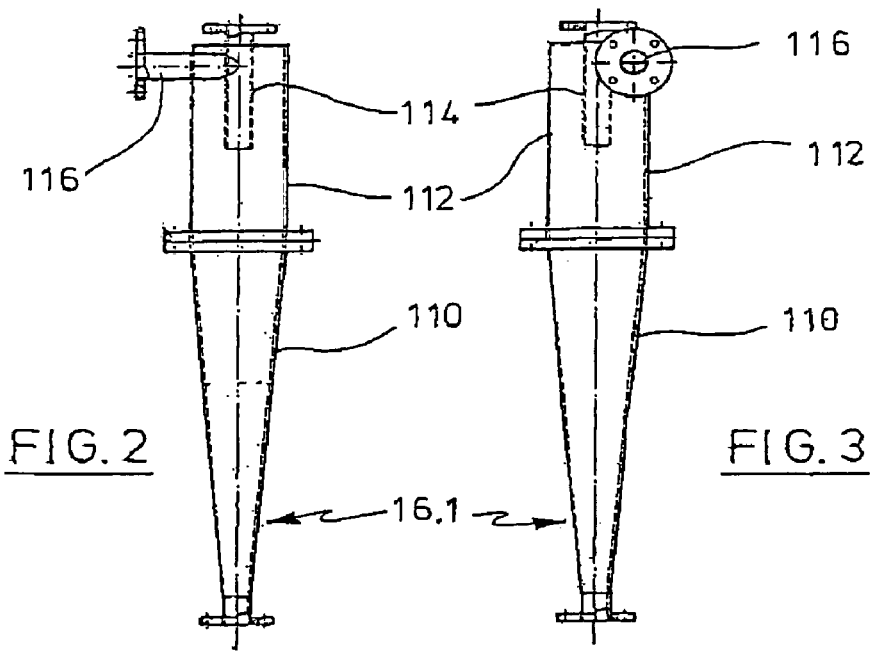
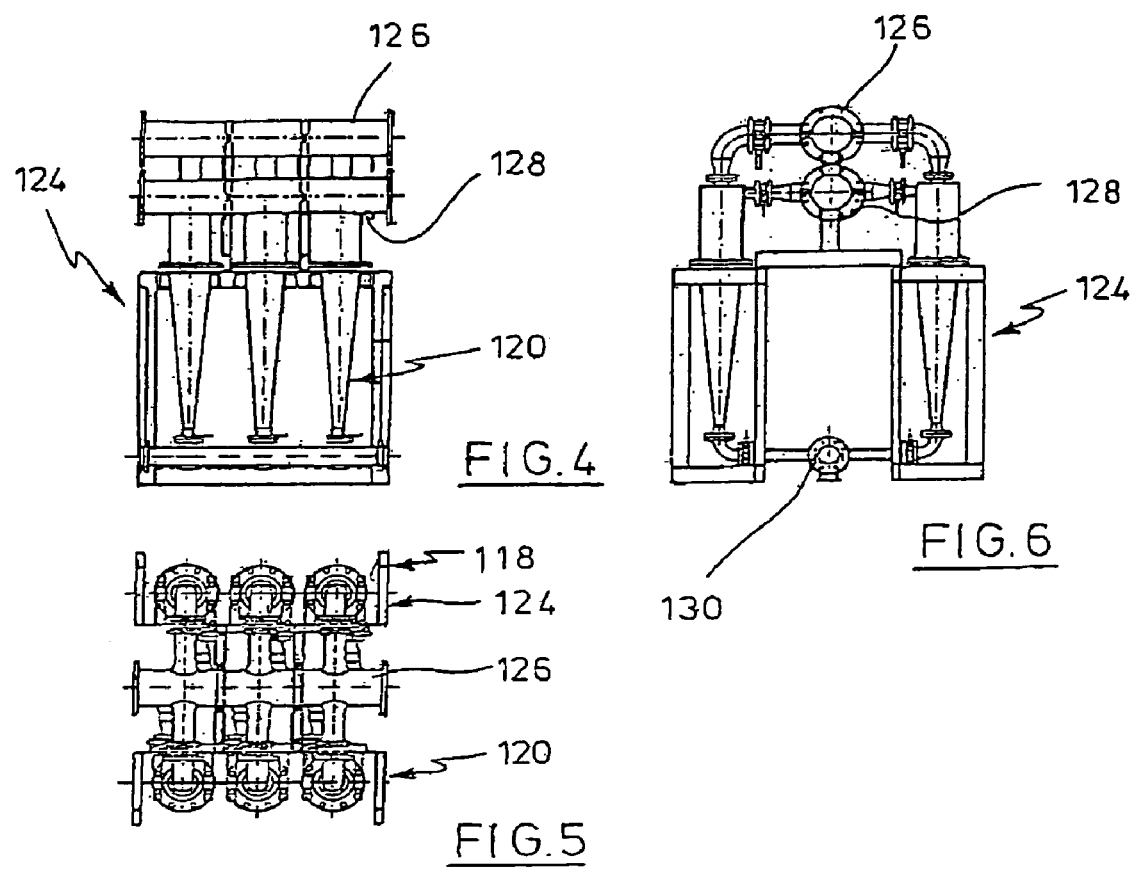

INSTALLATION FOR THE REMOVAL AND THE DEACTIVATION OF ORGANISMS IN THE BALLAST WATER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

With the ballast water, ships take up the most heterogeneous animal and vegetal organisms, e.g. mussels, fish, worms, crabs, bacteria, viruses and so on, which they set free again in extraneous regions where these are not native. These organisms often can spread rapidly in their new environment, because natural enemies are lacking. Through this, big ecological and/or economical damages can be brought about.

Different methods to prevent release of organisms with the water in tanks are known, e.g. by filtration, heat treatment, by reverse osmosis or UV-irradiation. Further, it is known to chemically combat organisms in water. All the stated methods are insufficient when applied to ballast water, however. The ballast water is conveyed into the ballast tanks in a very short time with a very high speed or high volume, respectively. In doing so, it must be ensured that the ballast water has been made aseptic to a large extent in this relatively short period of time.

The invention has the objective to create an installation for the removal and the deactivation of animal or vegetal organisms in the ballast water, which fullfills the security standards upon filling or clearance of the tanks with sparsely sumptuous means. Further, the installation according to the invention should bring about little expenditure in apparatus and should also be susceptible to be backfitted in a simple manner, e.g. on ships.

The installation according to the invention consists of at least two components. One of them has a gravity precipitation, e.g. a group of hydrocyclones which are parallel connected, a control equipment providing that only as much hydrocylones are in operation as is needed. As is generally known, hydrocyclones have only a restricted range of operation. That is why a control equipment switches the hydrocyclones on or off, in accordance with the conveying volume. The hydrocyclones do not only significantly reduce the sediment load carried along with the water, but they also remove a great deal of bigger organisms, in a dimension of more than 300 µm, e.g. The hydrocyclones are dimensioned such that these organisms can be efficiently separated, even when their specific weight is only faintly larger than 1.

A peculiarity of the hydrocyclones is that an arbitrary number can be connected together, in order to adjust them to any arbitrary quantity passing through, within the framework of their operating optimum. Hydrocyclones have also the advantage that they are almost maintenance-free and operationally reliable. They are insensitive against occlusions and can be simply and quickly attended, as the case may be. According to one form of the invention, they have a wear-resisting, corrosion-proof surface, e.g. in the form of a coating. Through this, the inner walls are protected against abrasive and corrosive strains.

The first feed pump is preferably a rotatory pump, as is usually in operation as a ballast water pump, e.g.

BRIEF SUMMARY OF THE INVENTION

According to a further form of the invention, the underflow of the hydrocyclones is connected to a second feed pump, to which a first regulating equipment is associated which measures the conveying volume in the underflow duct and conveys a predetermined constant volume flow, dependent on the number of switched-on hydrocyclones. This measure stabilises the operation of the hydrocyclones. The second feed pump, which is preferably a positive-displacement pump, is switchable in steps of constant conveying volume, each step being adjusted to a predetermined number of hydrocyclones which are in operation. Alternatively, it is conceivable to associate one downstream conveying pump to each underflow of at least a part of the cyclones.

It is also conceivable to envision another gravity precipitation, e.g. a centrifuge or the like. It is further conceivable to omit gravity precipitation and to provide a suitable filtration equipment instead. The filtration equipment has to be dimensioned such that even coarser particles can be deposited without problems.

According to another form of the invention, a control valve is disposed in the duct to the filtration equipment, to which a second regulating equipment is associated, which maintains a predetermined pressure in the upstream side duct by regulating the opening area of the control valve. This measure serves also for the stable operation of the hydrocyclones, which becomes particularly effective in the backwash mode of operation of the filter. As is generally known, the pressure on the filter decreases significantly during the backwash mode of operation. Anyhow, the operation of the hydrocyclones has to be maintained.

A filtration equipment, arranged downstream to the gravity precipitation, serves for the fine filtration and by doing so for the deposition of parts and germs with smaller dimensions, e.g. in the range of 300 µm to 50 µm. As the case may be, organisms which can not be deposited with the filtration equipment because of their geometry and extent are damaged such that they are easily amenable to a chemical or other further treatment step. Particularly advantageous is the use of a filtration equipment as has become known from DE 4312731. Each filter cartridge of a filtration equipment having several filter cartridges has a layer of overlayed elements of elastically deformable material, two neighbouring elements of which form a flowable gap, respectively. Each element has a lip on its input flow side, which is directed towards the flow with its broad front plane and is elastically displaceable and elastically deformable in the flow direction, the opening edge of which forms the gap opening, together with the opposing fixed opening edge of the neighbouring element. A particle entering in a jamming manner in the gap opening with the flow exercises an entraining force upon the opening edge of the lip, thus narrowing the gap opening.

In the described backwash filter, the purified liquid coming from the hydrocyclones is directed against the outlet side of a filtering surface in the backwashing mode of operation, whilst the inlet side is connected to a backwashing pump in a backwashing branch. The backwashing mode of operation is preferably initiated when the filter is gradually becoming clogged. According to one form of the invention, this case is detected by a differential pressure measurement. When the differential pressure is a predetermined value, the backwashing mode of operation is initiated via the control equipment.

The above-described adjustment in the upperflow and the underflow of the cylones provides for that the backwashing mode of operation has no nocuous effects on the operation of the hydrocyclones.

Organisms and germs that are in the water on the outlet side of the filtration equipment are rendered innocuous by the last component of the installation according to the invention, preferably by a chemical treatment with a means which preferably has a short time of degradation and is then biologically innocuous. The addition of a chemical, preferably a mixture of organic acids, like peroxyacetic acid, hydrogen peroxide and so forth, has the advantage that is does not only exert a desinfecting action when added to the water, but also thereafter in the tank, when the water is conveyed into a tank. As long as the water is in the tank, there is no danger of ecological damage. When the chemical is rapidly degraded, the ballast water can be passed after a short time into the sea, for instance, if that is required.

The supply of the chemical, preferably a biocide acting in a purely oxidative way, depends on the conveying volume, according to another form of the invention. It is to be understood that other treatment possibilities are conceivable besides the chemical treatment step, additionally or alternatively, like an UV-irradiation or the like, for instance.

The invention provides a dosage equipment for the application of the biocide, whereat according to a further form of the invention a pump for increasing the pressure is connected between the inlet point in the outlet duct of the filtration equipment and a point of the outlet duct upstream to it, and a dosage pump feeds the biocide into the outlet duct of the pump for increasing the pressure via a nozzle. In this bypass dosage, a partial flow is taken out of the filtered water and put under increased pressure. In the injection fitting, a biocide is metered into this pressurised water. As a result of this admixture, a premixing of the biocide with water takes already place. The premixed water is introduced into the mainstream, under conversion of the pressure energy into kinetic energy.

According to a further form of the invention, a static mixer is downstream side connected, which provides for an intimate mixing of the microbiocide with the water that is to be treated. The described metered addition of the microbiocide takes place with very small pressure drops. Therefore it is not necessary to dimension the first feed pump such that an additional pressure drop has to be compensated.

The individual treatment steps have preferably a bypass, so that a flow of water is provided even at malfunction or fail of auxiliary energy, e.g. in order to be able to ensure the ship security. If e.g. the mechanical-physical treatment step fails, for instance through failure of the hydrocyclone step or the filtration equipment, then this failure can be compensated for, for instance by an automatically occurring increase of the dosage volume of the microbiocide, so that a treatment of the conveyed water is ensured in each case.

The installation according to the invention is planned such that it can be operated almost maintenance-free and that it ensures the highest operational reliability as possible. It is suited for new constructions and for backfitting as well. The outer dimensions of the whole installation can be geared to the room available, e.g. on ships. All components can get along with the conventional deck to ceiling height. The demand of electrical energy is relatively low.

The installation according to the invention is not restricted to its application to ships, but it can be also used for land-based installations, when a like or similar problem definition is present.

The invention is subsequently explained in more detail, by means of a realisation example represented in drawings.

BRIEF DESCRIPTION OF THE SEVERAL VIEWS OF THE DRAWINGS

FIG. 2 shows a hydrocyclone of the installation according to FIG. 1 in a side view.

FIG. 3 shows the side view of the hydrocyclone according to FIG. 2, twisted at 180°.

FIG. 4 shows the side view of a group of hydrocylones for the installation according to FIG. 1.

FIG. 5 shows the top view of the group according to FIG. 4.

FIG. 6 shows the side view of the hydrocyclones according to FIG. 4.

DETAILED DESCRIPTION OF THE INVENTION

Figure 1:
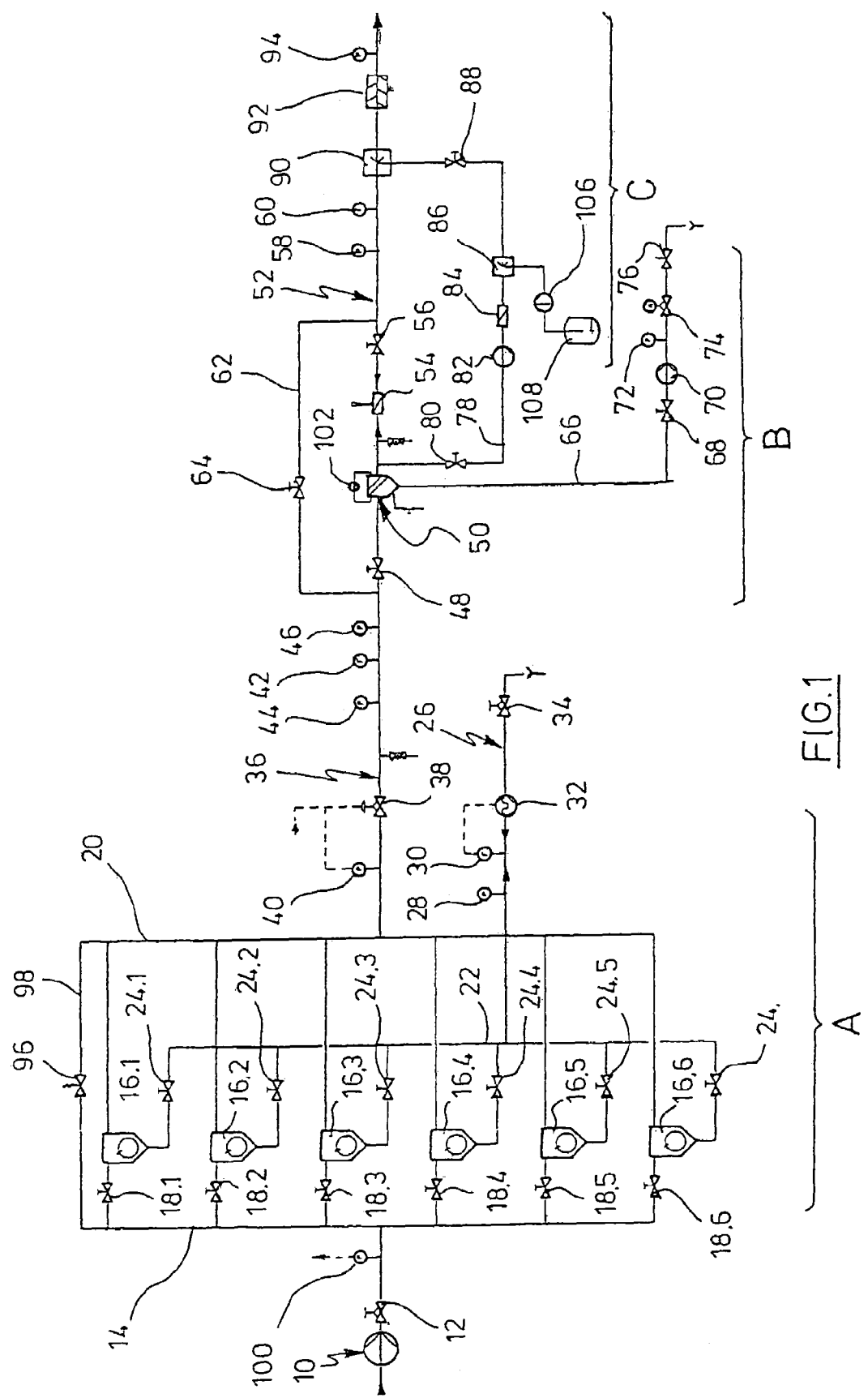
FIG. 1 shows schematically an installation according to the invention.

While this invention may be embodied in many different forms, there are described in detail herein a specific preferred embodiment of the invention. This description is an exemplification of the principles of the invention and is not intended to limit the invention to the particular embodiment illustrated The installation according to FIG. 1 has the steps or components A, B and C. The component A serves for the gravity separation of parts in water which are heavier than water. The component B is concerned with a fine filtration step.

The component C is concerned with the metered addition of a desinfectant. Subsequently, the individual components will be commented on in more detail.

A first feed pump 10, preferably a rotational pump, conveys via a stop valve 12 into a duct 14, which is in connection with six hydrocyclones 16.1 to 16.6, via stop valves 18.1 to 18.6. The upperflow of the hydrocyclones 16.1 to 16.6 is connected to a common duct 20. The underflow of the hydrocyclones 16.1 to 16.6 is connected to a common duct 22 via stop valves 24.1 to 24.6. The duct 22 is connected with a duct branch 26, in which a pressure gauge 28, a flow meter 30, a second feed pump 32 as well as a stop valve 34 are situated. The function of the described parts is dwelled on below.

The duct 20 is connected with a duct branch 36, in which a control valve 38 is disposed. Further, a pressure gauge 40 before the valve 38 and a flow meter 42 after the valve 38 are connected to the duct branch 36. Additional pressure gauges 44 and 46 are disposed before and after the flow meter 42.

A back-washable filtration equipment 50 is in connection with the branch 36 via a stop valve 48. A regulating fitting 54, a stop valve 56, a pressure gauge 58 and a flow meter 60 are connected to an outlet duct 52 of the filtration equipment 50. A stop valve 64 is disposed in a bypass duct 62, which is connected before the valve 48 and after the valve 56 with the inlet and the outlet of the filtration equipment 50, respectively.

In a suction duct 66, which is connected to the filtration equipment 50, a stop valve 68, a backwashing pump 70, a pressure gauge 72, a control valve 74 and an additional stop valve 76 are disposed.

A branch duct 78, which is connected to the branch outlet duct 52 immediately on the downstream side after the filtration equipment 50, contains a stop valve 80, a pump for increasing the pressure 82, a check valve 84, an injection nozzle 86 and a stop valve 88. On the downstream side of the flow meter 60, the branch duct 78 runs into the outlet duct 52, via an injection nozzle 90. On the downstream side of the injection nozzle 90, a static mixer 92 is disposed in the duct 52. On the downstream side of the static mixer 92, a pressure gauge 94 is connected to the outlet duct 52. The outlet duct 52 leads to a not shown tank, the ballast tank on a ship e.g.

A not shown control equipment controls the individual functions of the described parts and components, which furthermore contains a couple of control loops. Subsequently, the function of the installation according to FIG. 1 will be explained in more detail.

Upon open stop valves 12 and 18.1 to 18.6 and closed stop valve 96 in a bypass duct 98 for the hydrocyclones 16.1 to 16.6, the rotary pump 10 supplies sea water into the hydrocyclones 16.1 to 16.6. The underflow of the hydrocyclones 16.1 to 16.6 is connected to the duct 26, and the constant feed pump, preferably the positive displacement pump 32, conveys a constant volume from the underflow of the cyclones into the sea. However, the number of the actually switched-on hydrocyclones 16.1 to 16.6 depends on the required conveying volume, which may also be proportional to the pressure which can be measured on the downstream side of the pump 10 with the aid of the pressure gauge 100. When the ballast water tank is partially filled, the conveying volume enforcedly becomes smaller. As mentioned, the second feed pump 32 conveys a constant volume of water, the volume being dependent on the number of switched-on hydrocyclones 16.1 to 16.6, however. With the number of switched-on hydrocyclones 16.1 to 16.6 becoming bigger, the constant volume of water becomes stepwise larger. The flow meter 30 serves for the regulation of the conveying volume of the pump 32, which is predetermined by the number of cyclones in operation. It provides for that the conveying volume of the pump 32 remains constant, in dependence of the number of cyclones in operation.

Instead of one single second feed pump, it is also conceivable to connect a smaller pump to each underflow of a cyclone, in order to stabilise the operation of the cyclone.

A further control equipment is associated to the control valve 38, which provides for a constant pressure in the duct 20, via the pressure gauge 40. Through the adjustment of the pressure in the duct 20 and the conveying off of the underflow in a constant volume it is provided for the hydrocyclones 16.1 to 16.6 or for the switched-on cyclones to work under stable operating conditions.

In the filtration equipment 50, which is realised according to DE 4312731 e.g., organic components up to an extension of 50 µm are separated. The water, which is purified to a large extent, reaches the outlet duct 52, into which a desinfectant or a biocide is introduced via the nozzle arrangement 90.

The filtration equipment 50 is back-washable, and a differential pressure meter 102 measures the pressure on the inlet and on the outlet of the filtration equipment. When the differential pressure reaches a predetermined value, the back-wash operation mode is initiated. For this purpose, the regulation fitting 54 is set to the locking position by the control equipment. Further, the back-washing pump 70 is initiated, the stop valves 68 and 76 being open and the control valve 74 slowly opening itself. The water coming from the hydrocyclones serves for washing back the filter surfaces, and with this water, the filtrate comes back into the sea via the duct 66.

The filtration equipment 50 is back-washable, and a differential pressure meter 102 measures the pressure on the inlet and on the outlet of the filtration equipment. When the differential pressure reaches a predetermined value, the back-wash operation mode is initiated. For this purpose, the regulation fitting 54 is set to the locking position by the control equipment. Further, the back-washing pump 70 is initiated, the stop valves 68 and 76 being open and the control valve 74 slowly opening itself. The water coming from the hydrocyclones serves for washing back the filter surfaces, and with this water, the filtrate comes back into the sea via the duct 86.

The bypass duct 62 serves to shunt the filtration equipment 50, if any failure should take place. Through this, it is ensured that ballast water can be pumped into the ballast tank in this case also.

When the stop valve 80 is opened, the pump for increasing the pressure 82 branches off purified water which comes from the outlet duct 52 of the filtration equipment 50 and presses the water into the nozzle arrangement 90, the stop valve 80 being open. On the downstream side of the pump for increasing the pressure 82, there is an injection nozzle 86, which is connected to a dosage pump 106, which on its part aspirates biocide from a biocide container 108. In this way, a premixing of the biocide with water takes place already by the nozzle arrangement 86 and the nozzle arrangement 90. The complete mixing of the biocide with water takes place behind the nozzle arrangement 90, whereupon a further intense mixing takes place in the static mixer 92, which has a very low pressure drop. The pressure for the mixing is essentially furnished by the pump for increasing the pressure 82, so that the first feed pump 10 is not charged with this.

In the FIGS. 2 and 3, the hydrocyclone 16.1 is represented in more detail. It has a lower conical portion 110, with a cone angle of approximately 10°. It is connected to an upper cylindrical portion 112, into which sticks an inner pipe 114 from the upside, which extends downward for about half the height of the cylindrical portion 112. A supply pipe 116 is tangentially connected to the cylindrical portion 112 in the upper region. The hydrocyclone 16.1 is realised such that even particles are deposited the specific weight of which is only faintly higher than that of water or sea water, respectively.

In the FIGS. 4 to 6, a battery of hydrocyclones is represented. One recognises two rows, each with three hydrocyclones. The rows are designated with 118 and 120, respectively. They are kept in a frame 124 which can be drawn up on the deck of a ship, for instance. In centre between the rows, there is disposed a first pipe 126, a second pipe 128 and a third pipe 130, which are arranged one upon the other in one plane. They are in connection with the upperflow or the supply or the underflow of the cyclones, respectively. The arrangement of the cyclones is extraordinarily compact and can be accommodated fairly well, even at narrow spatial conditions.

Figure 7:
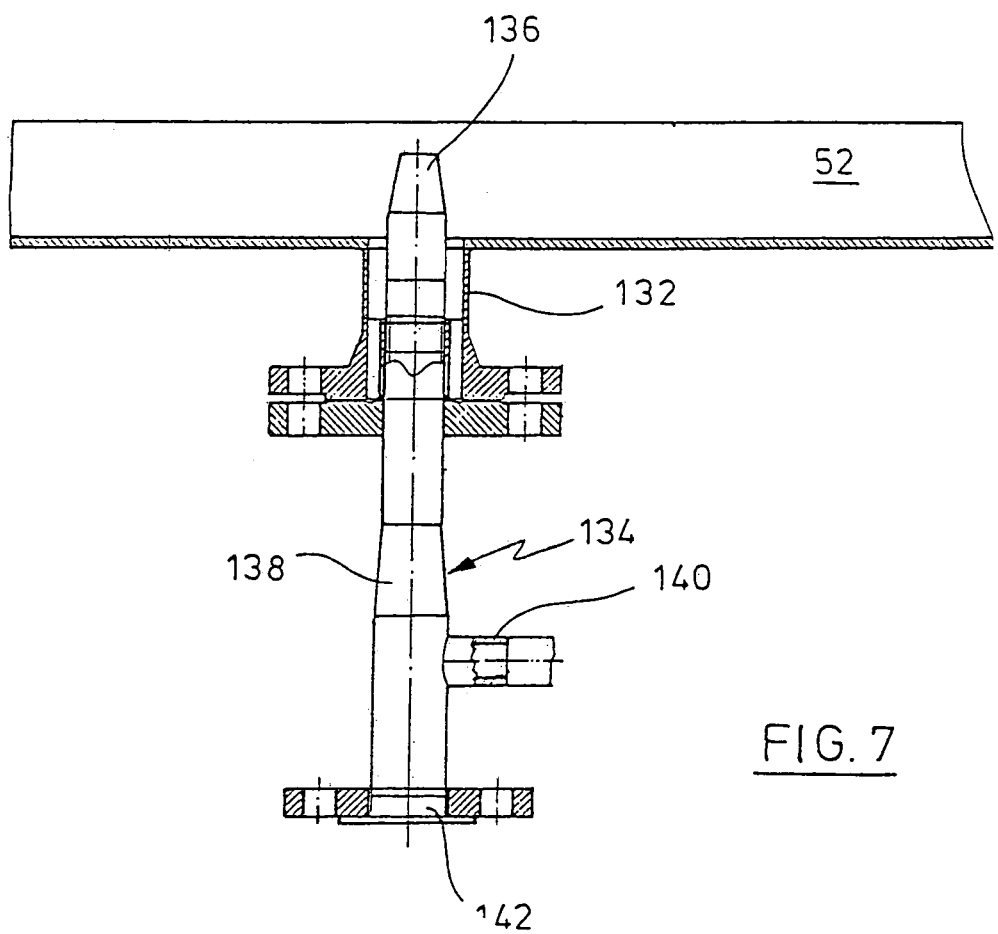
FIG. 7 shows in a section the supply of the microbiocide into the outlet duct of the filtration equipment.
Figure 8:
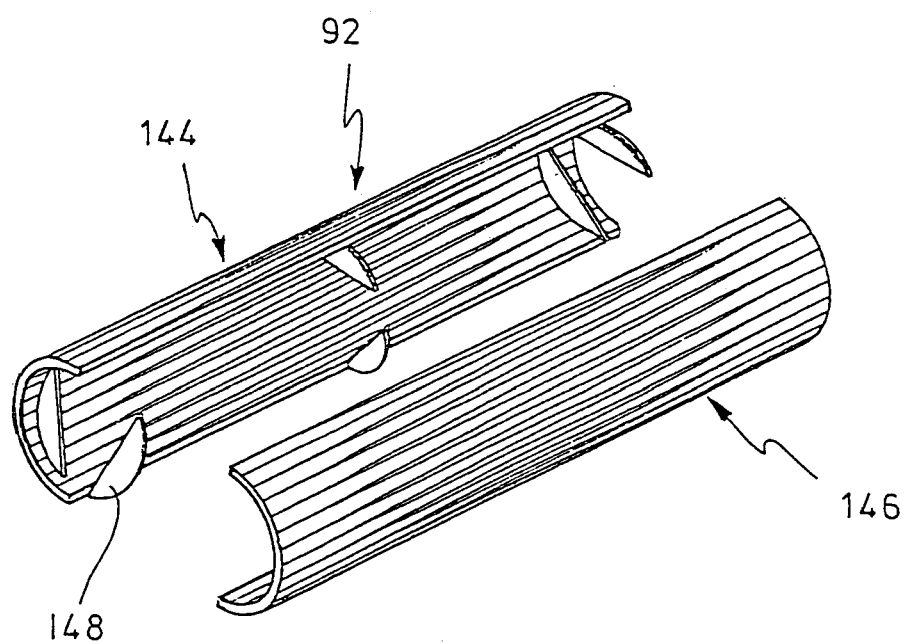
FIG. 8 shows a schematic, exploded perspective view of a static mixer of the installation according to FIG. 1.

In FIG. 7, the duct 52 is indicated, the outlet duct coming from the filtration equipment 50. It has a lateral junction 132, passing through which a pipe 134 is sealingly guided, which has a nozzle 136 on its upper free end and which has a nozzle-like contraction 138 outside of the duct 52. Below the contraction 138 a lateral pipe connection 140 is provided, which is in connection with the dosage pump 106. The lower end or the inlet 142 of the pipe 134 is in connection with the pump for increasing the pressure 82 according to FIG. 1. The microbiocide is brought or injected into the pipe 134, respectively, via the connection 140 and is already intensely mixed with the water coming from the pump for increasing the pressure 142, in the nozzle-like contraction 138 with the aid of the flow acceleration. The mixture of microbiocide and water is then injected approximately in centre into the flow in the outlet duct 52 via the nozzle arrangement 136. After the premixing in the pipe 134, a mixing in the outlet duct 52 takes place now, whereat a definite intense mixing occurs in the static mixer 92 which is indicated in FIG. 8.

In FIG. 8, the mixer is shown as consisting of two pipe halves 144, 146 which are centrically divided in the longside direction. In the interior of the static mixer 92, segment-like flow disturbers 148 are disposed, which each form a V-shaped flow cross-section, the V-shaped cross-section being twisted in distances on the axis, so that the flow is twisted around its longitudinal axis. The pressure drop in such a static mixer is about 0.2 to 0.4 bar.

It should be noted that the hydrocyclones 16.1 to 16.6 can be provided with a wear-resisting and corrosion-proof surface, a ceramic coating for instance, which decreases the frictional resistance and forms a resistance against abrasion and corrosion.

It should be further mentioned that a third control equipment controls the supply of microbiocide from the container 108 into the outlet duct 52, by measuring the volume flowing in the duct 52 by means of the volume flow measuring equipment 60, the dosage pump 106 thereat conveying the microbiocide in accordance to the measured volume.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Installation for removal and deactivation of organisms in ballast water, comprising:

- a first feed pump (10) for conveying the ballast water,
- an arrangement (A) of parallel connected hydrocyclones (16.1 to 16.6) for gravity precipitation of coarser solids and bigger organisms, connected to the first feed pump (10)
- equipment for the deactivation of organisms, connected downstream to the arrangement (A) of parallel connected hydrocyclones,
- a measuring device for measuring a conveying volume of the first feed pump (10),
- wherein the arrangement (A) of parallel connected hydrocyclones (16.1 to 16.6) are switchable on and off, respectively, and a control device which controls the number of switched-on hydrocyclones (16.1 to 16.6) in accordance with the measured conveying volume.

2. Installation according to claim 1, characterised in that a backwashable filtration equipment (50) is provided.

3. Installation according to claim 1, characterised in that at least one centrifuge is provided for gravity precipitation.

4. Installation according to claim 1, characterised in that an underflow of the hydrocyclones (16.1 to 16.6) is connected to a second feed pump (32), to which a first regulating equipment is associated which measures the conveying volume to the underflow and conveys a predetermined constant volume flow, dependent on the number of switched-on hydrocyclones (16.1 to 16.6).

5. Installation according to claim 1, characterised in that each hydrocyclone has an underflow, and in at least a part of the hydrocyclones, one downstream conveying pump is associated to each underflow.

6. Installation according to claim 4, characterised in that the second feed pump (32) is a positive-displacement pump.

7. Installation according to claim 2, characterised in that a control valve (38) is disposed in a duct (36) to the filtration equipment (50), to which a second regulating equipment is associated, which maintains a predetermined pressure in an upstream side duct (20) by regulating an opening area of the control valve (38).

8. Installation according to claim 2, characterised in that the filtration equipment (50) is formed such that upon switching to a backwashing mode of operation, an inlet of the filtration equipment (50) is connected with an outlet side of a filtering surface, whilst an inlet side of the filtering surface is connected to a backwashing pump (70) in a backwashing branch (66).

9. Installation according to claim 8, characterised in that a pressure gauge (102) is intercalated between the inlet and an outlet of the filtration equipment (50) and that a control equipment initiates the backwashing mode of operation when a pressure determined by the pressure gauge (102) reaches a predetermined value.

10. Installation according to claim 1, characterised in that a dosage equipment, joined to a reservoir (108) for biocide, is connected with an outlet conduit (52) downstream of the arrangement of parallel connected hydrocyclones for gravity precipitation.

11. Installation according to claim 10, characterised in that a pump for increasing a pressure (82) is parallel connected between an inlet point for the biocide in the outlet conduit (52) and an upstream side point of the outlet conduit, and that a dosage pump (106) feeds the biocide into an outlet duct of the pump for increasing a pressure (82).

12. Installation according to claim 11, characterised in that the pump for increasing a pressure (82) is connected to an end of an inlet pipe, which has a nozzle-shaped contraction (138) downstream of a tie-in point of the dosage pump (106).

13. Installation according to claim 12, characterised in that the inlet pipe (134) has a nozzle (136) on its end, which runs approximately into the midst of the outlet conduit (52).

14. Installation according to claim 10, characterised in that a third regulating equipment is provided, which regulates a dosage volume of the dosage equipment (106) in accordance with a conveying volume in the outlet conduit (52).

15. Installation according to claim 10, characterised in that on a side downstream to an inlet point of the biocide a static mixer (92) is disposed in the outlet conduit (52).

16. Installation according to claim 15, characterised in that the static mixer (92) has a pressure drop of less than 0.4 bar.

17. Installation according to claim 2, characterised in that a closable bypass (62) is provided for the filtration equipment (50).

18. Installation according to claim 1, characterised in that a closable bypass (98) is provided for the hydrocyclones (16.1 to 16.6).

19. Installation according to claim 1, characterised in that the hydrocyclones (16.1 to 16.6) are installed in a common frame (124) and that upperflow, underflow and supply duct are connected with parallel arranged pipes (126, 128, 130).

20. Installation according to claim 1, characterised in that the hydrocyclones (16.1 to 16.6) have a wear-resisting and corrosion-proof surface.

21. Installation for removal and deactivation of organisms in ballast water, comprising:
a first feed pump (10) for conveying the ballast water;
an arrangement (A) of parallel connected hydrocyclones (16.1 to 16.6) for gravity precipitation of coarser solids and bigger organisms, connected to the first feed pump (10);
a device for the deactivation of organisms, connected to an outlet conduit (52) downstream to the arrangement of parallel connected hydrocyclones;
wherein a dosage device, joined to a reservoir (108) for a biocide, is connected to the outlet conduit (52), a pump for increasing a pressure (82) is parallel connected between an inlet point for the biocide in the outlet conduit (52) and an upstream side point of the outlet conduit (52), and that a dosage pump (106) feeds the biocide into an outlet duct of the pump for increasing the pressure (82), and
on a side downstream to the inlet point of the biocide a static mixer (92) is disposed in the outlet conduit (52).

22. Installation according to claim 21, characterised in that a backwashable filtration equipment (50) is provided.

23. Installation according to claim 21, characterised in that the arrangement (A) of parallel connected hydrocyclones (16.1 to 16.6) are switchable on and off, respectively, and includes a measuring means for measuring a conveying volume of the first feed pump (10), and a control equipment which controls the number of switched-on hydrocyclones (16.1 to 16.6) in accordance with the measured conveying volume.

24. Installation according to claim 23, characterised in that an underflow of the hydrocyclones (16.1 to 16.6) is connected to a second feed pump (32), to which a first regulating equipment is associated which measures a conveying volume to the underflow and conveys a predetermined constant volume flow, dependent on the number of switched-on hydrocyclones (16.1 to 16.6).

25. Installation according to claim 23, characterised in that each hydrocyclone has an underflow, and in at least a part of the hydrocyclones, one downstream conveying pump is associated to each underflow.

26. Installation according to claim 21, characterised in that a control valve (38) is disposed in a duct (36) to a filtration equipment (50), to which a second regulating equipment is associated, which maintains a predetermined pressure in an upstream side duct (20) by regulating an opening area of the control valve (38).

27. Installation according to claim 21, characterised in that a filtration equipment (50) is formed such that upon switching to a backwashing mode of operation, an inlet of the filtration equipment (50) is connected with an outlet side of a filtering surface, whilst an inlet side of the filtering surface is connected to a backwashing pump (70) in a backwashing branch (66).

28. Installation according to claim 27, characterised in that a pressure gauge (102) is intercalated between the inlet and an outlet of the filtration equipment (50) and that a control equipment initiates the backwashing mode of operation when a pressure determined by the pressure gauge (102) reaches a predetermined value.

29. Installation according to claim 21, characterised in that the pump for increasing a pressure (82) is connected to an end of an inlet pipe, which has a nozzle-shaped contraction (138) on a side downstream of a tie-in point of the dosage pump (106).

30. Installation according to claim 29, characterised in that the inlet pipe (134) has a nozzle (136) on its end, which runs approximately into the midst of the outlet conduit (52).

31. Installation according to claim 21, characterised in that a third regulating equipment is provided, which regulates a dosage volume of the dosage pump (106) in accordance with a conveying volume in the outlet conduit (52).

32. Installation according to claim 21, characterised in that the static mixer (92) has a pressure drop of less than 0.4 bar.

33. Installation according to claim 21, characterised in that hydrocyclones (16.1 to 16.6) are installed in a common frame (124) and that upperflow, underflow and supply ducts are connected with parallel arranged pipes (126, 128, 130).

34. Installation for removal and deactivation of organisms in ballast water, comprising:
a first feed pump (10) for conveying the ballast water;
an arrangement (A) of parallel connected hydrocyclones (16.1 to 16.6) for gravity precipitation of coarser solids and bigger organisms, connected to the first feed pump (10);
a device for the deactivation of organisms, connected to an outlet conduit (52) downstream to the arrangement of parallel connected hydrocyclones for gravity precipitation, and
a closeable bypass (98) is provided for the hydrocyclones (16.1 to 16.6).

35. Installation according to claim 34, characterized in that a backwashable filtration equipment (50) is provided.

36. Installation according to claim 34, characterised in that an underflow of the hydrocyclones (16.1 to 16.6) is connected to a second feed pump (32), to which a first regulating equipment is associated which measures a conveying volume to the underflow and conveys a predetermined constant volume flow, dependent on the number of switched-on hydrocyclones (16.1 to 16.6).

37. Installation according to claim 34, characterised in that each hydrocyclone has an underflow, and in at least a part of the hydrocyclones, one downstream conveying pump is associated to each underflow.

38. Installation according to claim 35, characterised in that a control valve (38) is disposed in a duct (36) to the filtration equipment (50), to which a second regulating equipment is associated, which maintains a predetermined pressure in an upstream side duct (20) by regulating an opening area of the control valve (38).

39. Installation according to claim 34, characterised in that a dosage equipment, joined to a reservoir (108) for biocide, is connected with an outlet conduit (52) downstream to the arrangement of hydrocyclones for gravity precipitation.

40. Installation according to claim 39, characterised in that a pump for increasing a pressure (82) is parallel connected between an inlet point for the biocide in the outlet conduit (52) and an upstream side point of the outlet conduit, and that a dosage pump (106) feeds the biocide into an outlet duct of the pump for increasing a pressure (82).

41. Installation according to claim 40, characterised in that the pump for increasing a pressure (82) is connected to an end of an inlet pipe, which has a nozzle-shaped contraction (138) downstream of a tie-in point of the dosage pump (106).

42. Installation according to claim 41, characterised in that the inlet pipe (134) has a nozzle (136) on its end, which runs approximately into the midst of the outlet conduit (52).

43. Installation according to claim 39, characterised in that a third regulating equipment is provided, which regulates a dosage volume of the dosage equipment (106) in accordance with a conveying volume in the outlet conduit (52).

44. Installation according to claim 39, characterised in that on a side downstream to an inlet point of the biocide a static mixer (92) is disposed in the outlet conduit (52).

45. Installation according to claim 44, characterised in that the static mixer (92) has a pressure drop of less than 0.4 bar.

46. Installation according to claim 35, characterised in that a closable bypass (62) is provided for the filtration equipment (50).

47. Installation according to claim 34, characterised in that the hydrocyclones (16.1 to 16.6) are installed in a common frame (124) and that upperflow, underflow and supply duct are connected with parallel arranged pipes (126, 128, 130).

* * * * *